United States Patent
Crucs

(10) Patent No.: US 7,616,796 B2
(45) Date of Patent: Nov. 10, 2009

(54) SYSTEM AND METHOD FOR SENSOR DEVICE MANUFACTURER ORIENTED CALIBRATION

(75) Inventor: Kevin M. Crucs, Akron, OH (US)

(73) Assignee: Apteryx, Inc., Akron, OH (US)

( * ) Notice: Subject to any disclaimer, the term of this patent is extended or adjusted under 35 U.S.C. 154(b) by 821 days.

(21) Appl. No.: 11/203,858

(22) Filed: Aug. 15, 2005

(65) Prior Publication Data

US 2007/0036454 A1 Feb. 15, 2007

(51) Int. Cl.
G06K 9/00 (2006.01)
G01D 18/00 (2006.01)
G01J 5/02 (2006.01)

(52) U.S. Cl. .................. 382/128; 378/207; 250/339.09

(58) Field of Classification Search .................. 382/128, 382/129, 130, 131, 132, 133, 134, 254, 286; 378/207; 250/252.1, 339.09, 341.5, 363.09, 250/559.1; 600/407, 425; 702/85
See application file for complete search history.

(56) References Cited

U.S. PATENT DOCUMENTS 6,517,484 B1 * 2/2003 Wilk et al. .................. 600/437
7,065,393 B2 * 6/2006 Sati et al. .................. 600/407

* cited by examiner

Primary Examiner—Abolfazl Tabatabai
(74) Attorney, Agent, or Firm—Hahn Loeser & Parks LLP

(57) ABSTRACT

A system and method for providing image calibration data for calibrating a digital medical image are disclosed. The system comprises a computer-based platform hosting a medical imaging software application. The computer-based platform is used for accessing a digital medical image, using at least the medical imaging software application. The computer-based platform is further used for reading manufacturer, device, size, and/or resoluton information associated with the digital medical image, using at least the medical imaging software application. The computer-based platform is also used for accessing stored image calibration data corresponding to the digital medical image based on the read manufacturer, device, size, and/or resolution information, using at least the medical imaging software application. The computer-based platform is further used for applying the accessed image calibration data to the digital medical image to generate a newly calibrated digital medical image, using at least the medical imaging software application.

28 Claims, 6 Drawing Sheets

FIG. 2

| MANUFACTURER | Gigantic Imaging Co. | Gigantic Imaging Co. | Gigantic Imaging Co. | Gigantic Imaging Co. |
|---|---|---|---|---|
| DEVICE | Intra-oral CCD X-ray sensor | Intra-oral CCD X-ray sensor | Intra-oral CCD X-ray sensor | Intra-oral CCD X-ray sensor |
| SIZE | #1 _231_ | #2 _232_ | #3 _233_ | #3 _233_ |
| RESOLUTION | 150x150 dpi | 150x150 dpi | 150x150 dpi | 200x200 dpi |
| IMAGE CALIBRATION DATA | 1.100 | 1.150 | 1.129 | 1.505 |

# SYSTEM AND METHOD FOR SENSOR DEVICE MANUFACTURER ORIENTED CALIBRATION

TECHNICAL FIELD

Certain embodiments of the present invention relate to digital medical imaging. More particularly, certain embodiments of the present invention relate to a system and method to provide calibration data in a medical imaging application in order to calibrate digital medical images.

BACKGROUND OF THE INVENTION

When a digital medical image is captured by a medical imaging machine using a particular imaging sensor, the captured image can often be distorted in one or more distance (i.e., length) dimensions across the image. That is, the distance relationship between any two points of anatomy in the image can be longer or shorter than the actual real-world distance. Such distortions of distance may be caused by the various parts of the imaging hardware including the imaging sensor, the x-ray generator, any filtering media, and the medical imaging machine itself.

Many times, a user (e.g., a medical doctor or dentist) of a medical imaging machine will switch imaging sensors during an imaging session in order to use different imaging sensors which are optimized for imaging different anatomical features of a patient. Also, a user may use two or more different medical imaging machines with several different imaging sensors to image various anatomical features of a patient.

Today, medical imaging software applications that are used to process captured digital medical images typically include a calibration routine to attempt to calibrate out any distance distortions in an image. Calibration may be performed as part of the capture process or may be performed post-capture. The calibration routine uses calibration data (e.g., a calibration factor) to calibrate the image for distance. However, such medical imaging software applications are typically limited to allowing only one calibration data (e.g., only one calibration factor) to be set for a given medical imaging machine (e.g., one calibration factor for each different manufacturer of a medical imaging machine type).

If a user of a particular medical imaging machine uses the medical imaging machine with a first imaging sensor (e.g. a first X-ray sensor), and then wants to proceed to use the same medical imaging machine with a second imaging sensor (for example a second X-ray sensor being of a different size than the first X-ray sensor), the user has to manually change the calibration factor in the medical imaging software application to correspond to the different distortions caused by the second imaging sensor. That is, the correct calibration factor for the combination of the medical imaging machine and the first imaging sensor is not the correct calibration factor for the combination of the medical imaging machine and the second imaging sensor.

Having to manually change calibration data when switching from one sensor to another for a given medical imaging machine wastes time and can lead to mistakes (e.g., forgetting to change the calibration data when switching sensors, or inputting the wrong calibration factor when switching sensors).

Further limitations and disadvantages of conventional, traditional, and proposed approaches will become apparent to one of skill in the art, through comparison of such systems and methods with the present invention as set forth in the remainder of the present application with reference to the drawings.

BRIEF SUMMARY OF THE INVENTION

An embodiment of the present invention provides a method of providing image calibration data for calibrating a digital medical image. The method comprises defining one image calibration data for each unique combination of manufacturer, device, size, and/or resolution information that is associated with digital medical images to be processed by a medical imaging software application. The method also comprises storing the defined image calibration data such that the defined image calibration data may be accessed by at least the medical imaging software application. The method further comprises accessing a digital medical image, using at least the medical imaging software application, and reading manufacturer, device, size and/or resolution information associated with the accessed digital medical image. The method also comprises accessing one of the stored image calibration data corresponding to the digital medical image based on the read manufacturer, device, size, and/or resolution information, using at least the medical imaging software application. The method further comprises applying the accessed image calibration data to the digital medical image to generate a new calibrated digital medical image, using at least the medical imaging software application.

Another embodiment of the present invention comprises a system for providing image calibration data and for calibrating a digital medical image. The system comprises a computer-based platform hosting a medical imaging software application. The computer-based platform is used for at least accessing a digital medical image, using at least the medical imaging software application, and reading manufacturer, device, size, and/or resolution information associated with the accessed digital medical image. The computer-based platform is further used for accessing a stored image calibration data corresponding to the digital medical image based on the read manufacturer, device, size, and/or resolution information, using at least the medical imaging software platform. The computer-based platform is also used for applying the accessed image calibration data to the digital medical image to generate a new calibrated digital medical image, using at least the medical imaging software platform.

These and other advantages and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is an exemplary table defining three calibration data factors provided by the system of FIG. 1 for three unique combinations of manufacturer, device, size, and/or resolution information, in accordance with an embodiment of the present invention.

DETAILED DESCRIPTION OF THE INVENTION

Figure 1:
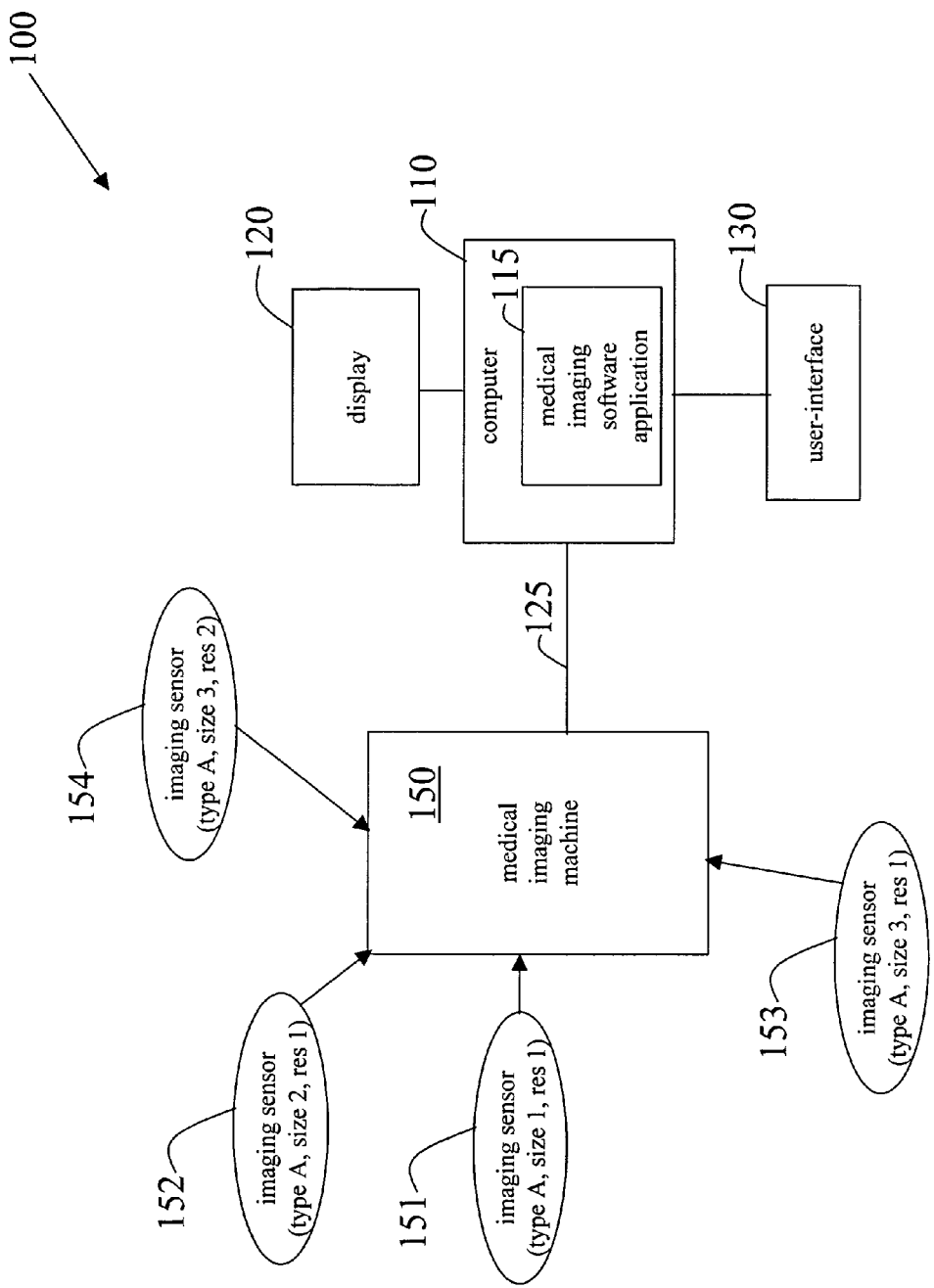
FIG. 1 is a schematic block diagram of an exemplary first embodiment of a system for providing image calibration data and for calibrating a digital medical image, in accordance with various aspects of the present invention.

FIG. 1 is a schematic block diagram of an exemplary first embodiment of a system 100 for providing image calibration data and for calibrating a digital medical image, in accordance with various aspects of the present invention. The general idea is to automatically provide calibration data, down to the imaging sensor size level and/or resolution level, to correct for distortions in digital medical images where the distortions are a result of the hardware being used to capture the digital medical images. The system includes a computer 110 hosting a medical imaging software application 115. The computer 110 may include any processor-based platform such as, for example, a personal computer (PC) or a workstation. The medical imaging software application 115 may include any software application that can run on the computer 110 and which is able to perform at least the various functions described herein that are attributed to the medical imaging software application 115.

The system 100 also includes a display 120 and a user interface 130 which are operationally connected to the computer 110. The display 120 may include a CRT monitor, an LCD flat panel array, or any other type of display, in accordance with various embodiments of the present invention. The display 120 may or may not be an integral part of the computer 110, in accordance with various embodiments of the present invention. The user interface 130 may include at least one of a keyboard, a mouse, a touch-screen display, or any other mechanism that allows a user to control the computer 110 and the medical imaging software application 115 running on the computer 110, in accordance with various embodiments of the present invention. The user interface 130 may or may not be an integral part of the computer 110, in accordance with various embodiments of the present invention.

In accordance with certain embodiments of the present invention, the system 100 may include a medical imaging machine 150 which may operationally interface to one or more medical imaging sensors 151-154, for example. The medical imaging machine 150 operationally interfaces to the computer 110 in order to transmit (i.e., download) digital medical images, captured by the medical imaging machine 150, to the computer 110. The medical imaging machine 150 may be any type of medical imaging machine such as, for example, an intra-oral X-ray machine, a pan-oral X-ray machine, a computed tomography (CT) machine, an ultrasound imaging machine, a thermal imaging machine, a magnetic resonance (MR) imaging machine, or any other type of medical imaging machine that is used to image at least one portion of a person's body. The computer 110 may be an integral part of the imaging machine 150, in accordance with various embodiments of the present invention.

The interface 125 between the computer 110 and the medical imaging machine 150 may include a wired or wireless interface, in accordance with various embodiments of the present invention. Also, the interface 125 may be a network interface such as a local area network (LAN) interface, a wide area network (WAN) interface, a DICOM interface, the Internet, or any other type of network interface, in accordance with various embodiments of the present invention, allowing for the computer 110 to be located remotely from the medical imaging machine 150.

The imaging sensors 151-154 may be any of, for example, a digital X-ray sensor, an ultrasound probe, a thermal imaging sensor, a digital camera, an RF sensor (e.g., an MR coil), or any other type of imaging sensor that may interface to the medical imaging machine 150 in order to capture medical images of a particular imaging modality type. In accordance with the embodiment of FIG. 1, the imaging sensors 151-154 are all of a same type (type A) but are of three different sizes (1, 2, 3) and two different resolutions. For example, referring to FIG. 1 and FIG. 2, the four sensors 151-154 may be made by the same manufacturer (Gigantic Imaging Co.) and may each be an intra-oral CCD X-ray sensor type, but being of three different sizes (#1, #2, #3) and two different resolutions (150×150 dpi and 200×200 dpi).

FIG. 2 is an exemplary table 200 defining four calibration data factors provided by the system of FIG. 1 for four unique combinations of manufacturer 210, device 220, size 230, and/or resolution 240 information, in accordance with an embodiment of the present invention. Each size 230 corresponds to a different physical size and/or shape of the imaging sensor. For example, size #1, 231, may be optimized for vertical adult periapical imaging and pedodontic imaging. Size #2, 232, may provide comfortable positioning via rounded corners and provide a larger active area for horizontal periapical and bitewing imaging. Similarly, size #3, 233, may be optimized for some other intra-oral imaging application. The resolution is defined as, for example, the number of dots-per-inch (dpi). An image that was previously calibrated based on a first resolution may also be re-calibrated at a second resolution (e.g., at a new resolution of 200×200 dpi vs. the previous resolution of 150×150 dpi), in accordance with an embodiment of the present invention.

Each sensor 151-154 can contribute to distortions in distance (i.e., length) across the captured digital image in a different manner. Therefore, to correct for such different distortions, separate image calibration data is provided for each imaging sensor. For example, the calibration data for the first imaging sensor 151 may be a single numeric factor of 1.100 in order to calibrate a first digital intra-oral image captured using the sensor 151 by correcting distortion in the captured (un-calibrated or previously calibrated) image. The calibration data for the second imaging sensor 152 may be a single numeric factor of 1.150 in order to calibrate a second digital intra-oral image captured using the sensor 152 by correcting distortion in the captured (un-calibrated or previously calibrated) image. The calibration data for the third imaging sensor 153 may be a single numeric factor of 1.129 in order to calibrate a third digital intra-oral image captured using the sensor 153 by correcting distortion in the captured (un-calibrated or previously calibrated) image. The calibration data for the fourth imaging sensor 154 may be a single numeric factor of 1.505 in order to calibrate a fourth digital intra-oral image captured using the sensor 154.

Distortion of distance across any single dimension of an un-calibrated image may be linear or non-linear. To correct for linear distortion across a single dimension, the calibration data may comprise a single numeric factor that gets applied to the positional pixel data of the un-calibrated image. To correct for linear distortion across two dimensions, the calibration data may comprise two numeric factors that get applied to the positional pixel data of the un-calibrated (or previously calibrated) image (one across a first dimension and one across a second dimension). To correct for non-linear distortion in an un-calibrated image, the calibration data may comprise a non-linear function that gets applied to the positional pixel data of the un-calibrated image, in one or two dimensions, for example. Embodiments of the present invention take advantage of digital medical images that are "tagged" with imaging hardware information including manufacturer, device, size, and/or resolution information.

Figure 3:
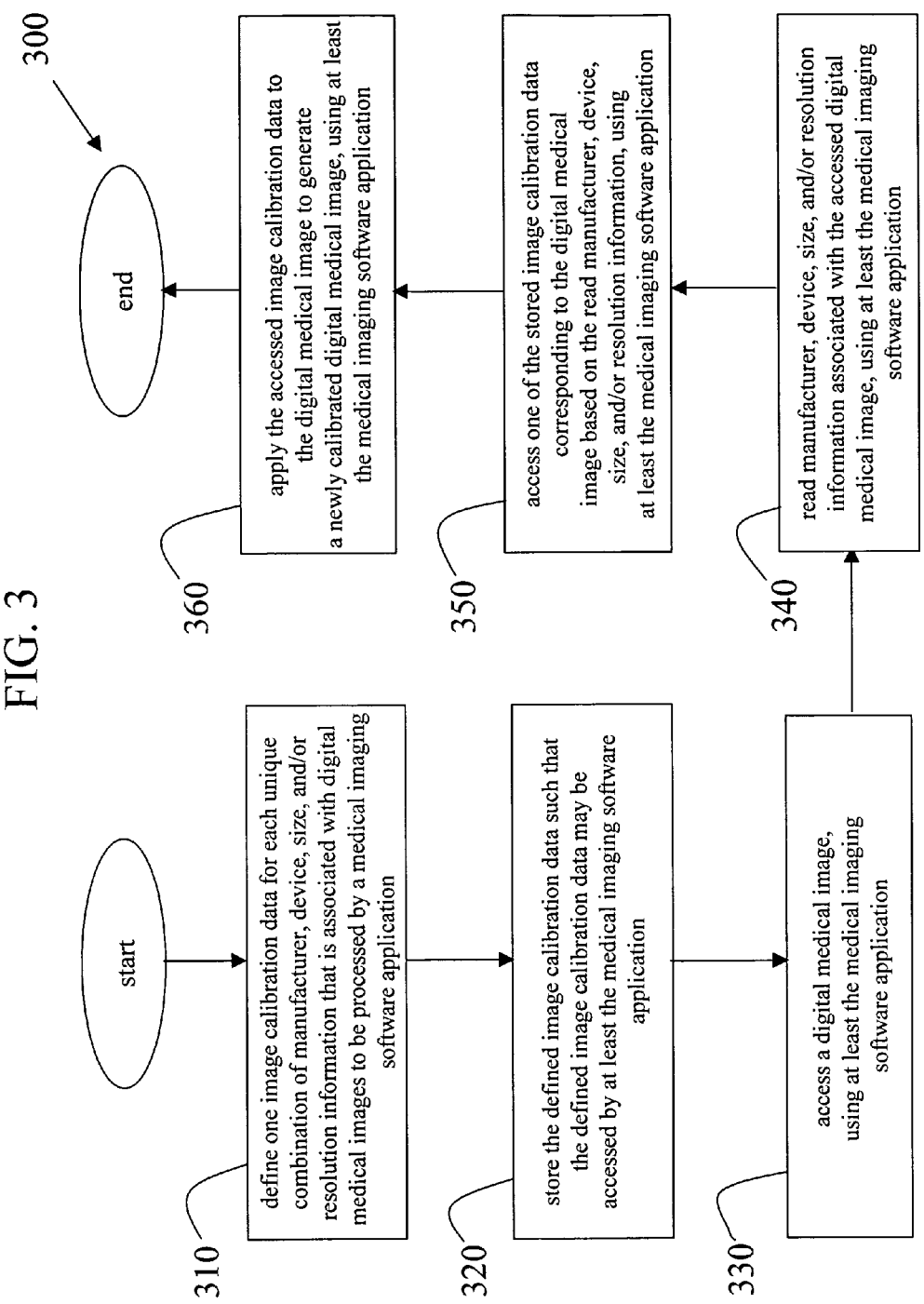
FIG. 3 is a flowchart of an exemplary embodiment of a method of providing image calibration data for calibrating a digital medical image using at least a portion of the system of FIG. 1, in accordance with various aspects of the present invention.

FIG. 3 is a flowchart of an exemplary embodiment of a method 300 of providing image calibration data for calibrating a digital medical image using at least a portion of the system 100 of FIG. 1, in accordance with various aspects of the present invention. In step 310, one image calibration data is defined for each unique combination of manufacturer, device, size, and/or resolution information that is associated with digital medical images to be processed by a medical imaging software application. In step 320, the defined image calibration data are stored such that the defined image calibration data may be accessed by at least the medical imaging software application. In step 330, a digital medical image is accessed, using at least the medical imaging software application. In step 340, the manufacturer, device, size, and/or resolution information associated with the digital medical image is read, using at least the medical imaging software application. In step 350, one of the stored image calibration data corresponding to the digital medical image is accessed based on the read manufacturer, device, size, and/or resolution information, using at least the medical imaging software application. In step 360, the accessed image calibration data is applied to the digital medical image to generate a new calibrated digital medical image, using at least the medical imaging software application.

Step 340 assumes that, when a digital medical image is captured, it is "tagged" with (i.e., associated with) the correct manufacturer, device, size, and/or resolution information corresponding to the hardware used to capture the image. For example, the DICOM (Digital Imaging and Communications in Medicine) standard allows for associating manufacturer, device, size, and/or resolution information with a digital medical image.

Figure 4:
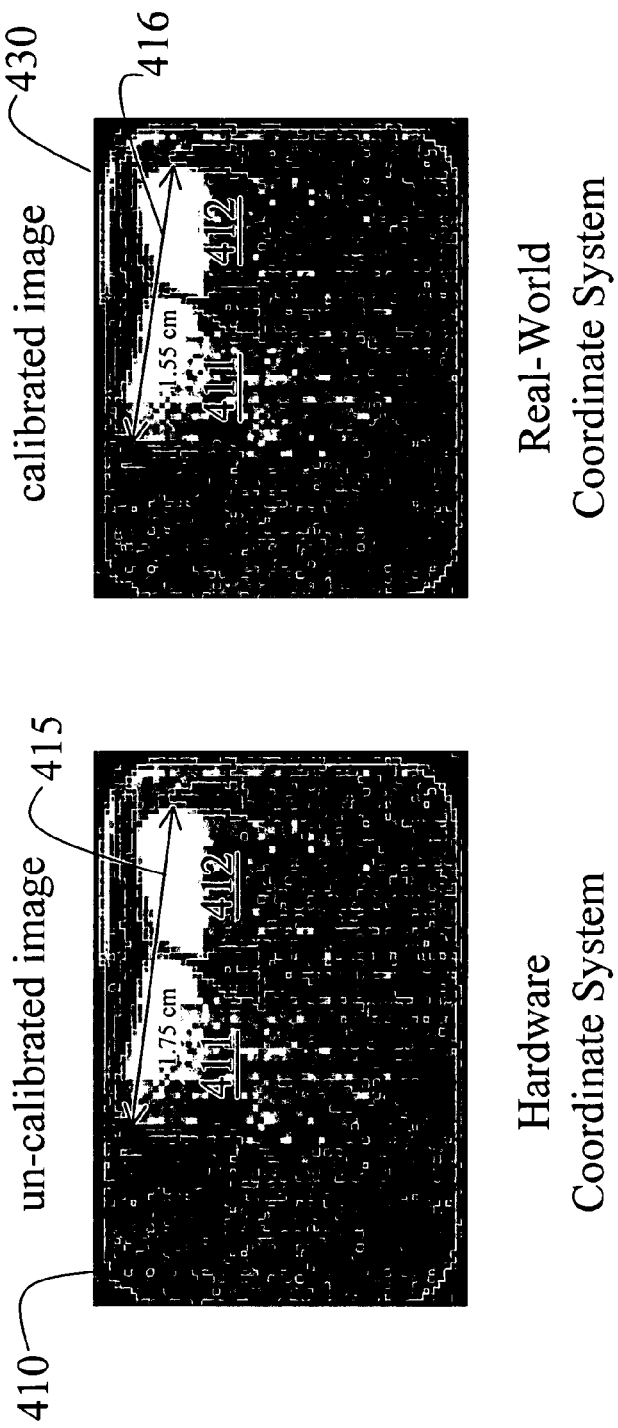
FIG. 4 is an exemplary illustration of an image that has been calibrated using the method of FIG. 3 and the system of FIG. 1, in accordance with an embodiment of the present invention.

As an example, FIG. 4 is an exemplary illustration of an un-calibrated intra-oral image that has been calibrated using the method of FIG. 3 and the system of FIG. 1, in accordance with an embodiment of the present invention. The un-calibrated image 410 is captured using the medical imaging machine 150 and the imaging sensor 153 (see FIG. 1). The un-calibrated image 410 is substantially linearly distorted, mostly in the horizontal direction, due to the imaging hardware used to capture the image (i.e., the medical imaging machine 150 and the imaging sensor 153). Exactly how much distortion is contributed by the imaging sensor 153 and the various parts of the medical imaging machine 150 are not important. It is only important to understand the combined effect and to define a calibration factor that corrects the resultant distortion when applied to the un-calibrated image 410.

As can be seen in FIG. 4, a measured distance 415 across two adjacent teeth 411 and 412 is 1.75 cm. This measured distance 415 is distorted because it is longer than it actually is in the real world (i.e. in the patient's real mouth). The un-calibrated image 410 is in the coordinate system of the imaging hardware (i.e., the imaging sensor 153 and the medical imaging machine 150). In accordance with an embodiment of the present invention, the medical imaging software application 115 reads the manufacturer, device, size, and/or resolution information associated with the un-calibrated image 410 as Gigantic Imaging Co, Intra-oral CCD X-ray sensor, #3, and res #1 respectively. The medical imaging software application 115 then looks up or accesses the corresponding image calibration data (i.e. the numeric factor 1.129) in the table 200 of FIG. 2 which stores the previously defined image calibration data. The image calibration data may be stored in a memory of the computer 110 as part of the medical imaging software application 115, in accordance with an embodiment of the present invention. The medical imaging software application 115 processes the un-calibrated image 410 by applying the accessed image calibration data factor of 1.129 to the positional pixel data of the un-calibrated image 410 to generate the calibrated image 430. The calibrated image 430 is corrected for distortions of distance and corresponds to the real-world coordinate system of the patient who was imaged. The real-world distance 416 across the two teeth 411 and 412 is measured as 1.55 cm in the calibrated image 430, which is significantly shorter than the corresponding distance 415 of 1.75 cm in un-calibrated image 410.

Figure 5:
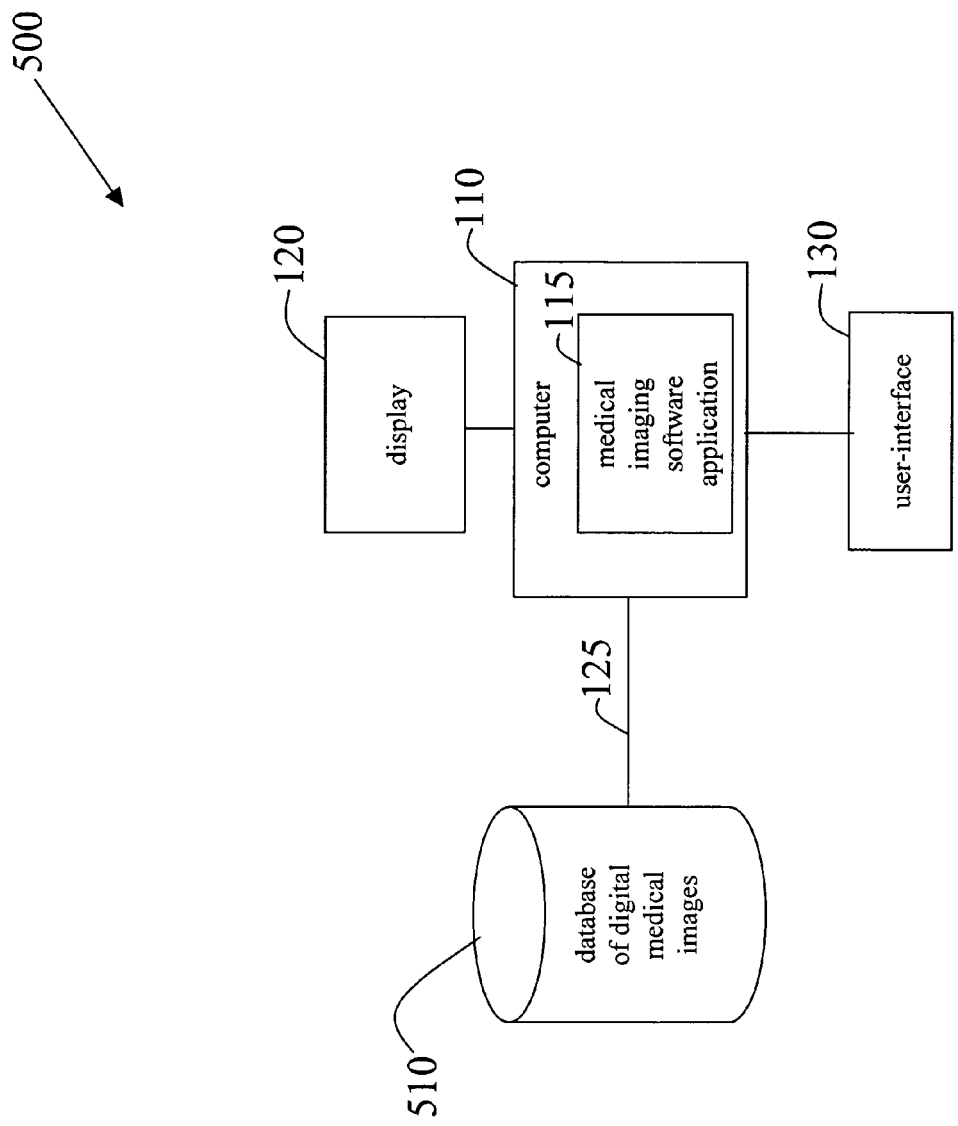
FIG. 5 is a schematic block diagram of an exemplary second embodiment of a system for providing image calibration data and for calibrating a digital medical image, in accordance with various aspects of the present invention.

FIG. 5 is a schematic block diagram of an exemplary second embodiment of a system 500 for providing image calibration data and for calibrating a digital medical image, in accordance with various aspects of the present invention. The system 500 includes the computer 110, medical imaging software application 115, display 120, user-interface 130, and interface 125 as described above for FIG. 1. The system 500 also includes a digital storage medium 510 for storing digital medical images (e.g., a server hosting a database of digital medical images). The computer 110 operationally interfaces to the digital storage medium 510 via the interface 125. The computer 110 may access digital medical images from the digital storage medium 510. Each digital medical image stored on the digital storage medium 510 includes associated manufacturer, device, size, and/or resolution information as previously described. When the computer 110 accesses a digital medical image from the digital storage medium 510, the associated manufacturer, device, size, and/or resolution information is accessed as well. In accordance with various alternative embodiments of the present invention, the digital storage medium 510 may comprise a magnetic storage device, an optical storage device, or any other type of digital storage device capable of storing digital medical images.

Figure 6:
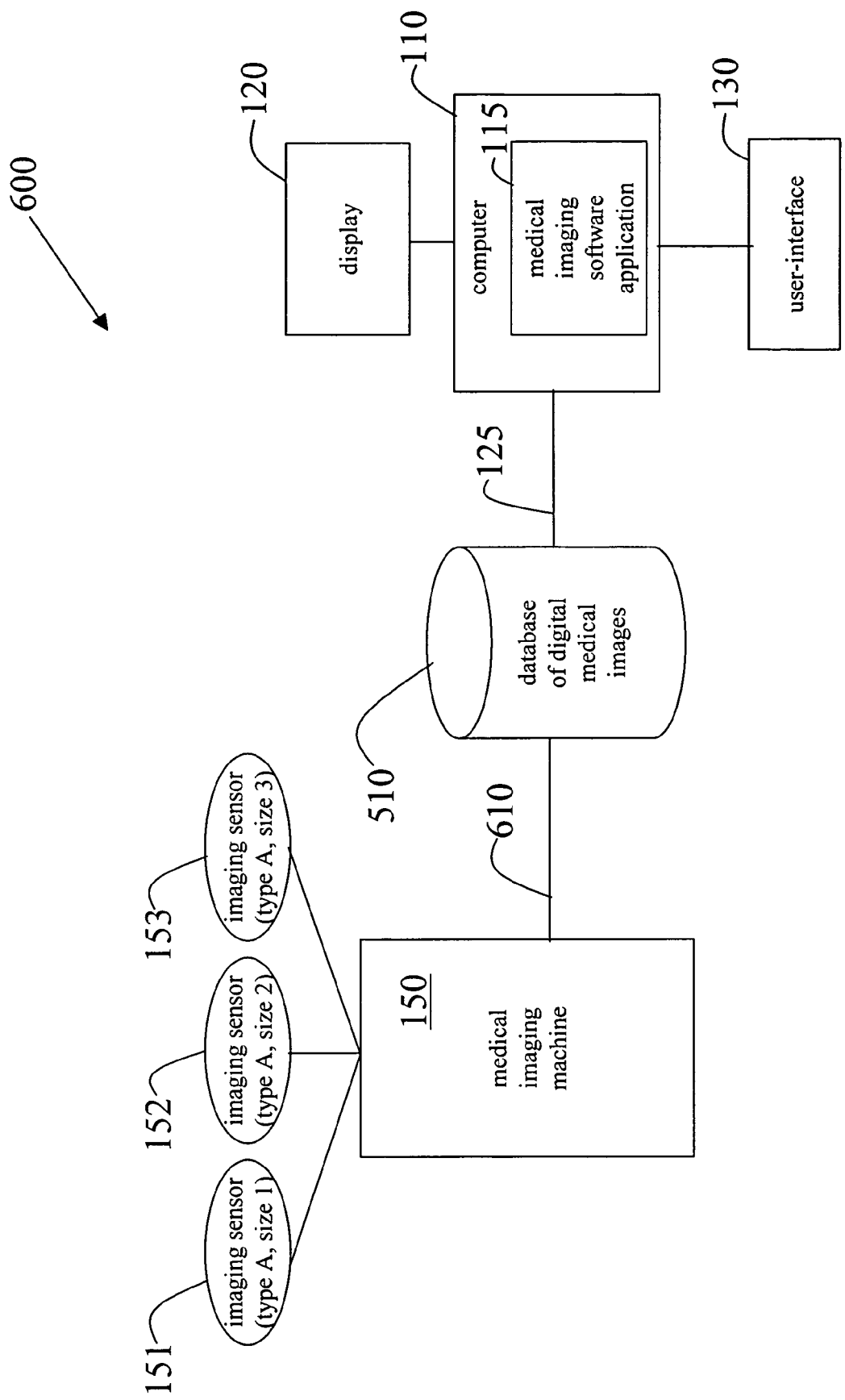
FIG. 6 is a schematic block diagram of an exemplary third embodiment of a system for providing image calibration data and for calibrating a digital medical image, in accordance with various aspects of the present invention.

FIG. 6 is a schematic block diagram of an exemplary third embodiment of a system 600 for providing image calibration data and for calibrating a digital medical image, in accordance with various aspects of the present invention. The system 500 includes all of the elements of the system 100 of FIG. 1 and further includes the digital storage medium 510 of FIG. 5, operationally interfacing between the computer 110 and the medical imaging machine 150. The interface 610 between the digital storage medium 510 and the medical imaging machine 150 may include a wired or wireless interface, in accordance with various embodiments of the present invention. Also, the interface 610 may be a network interface such as a local area network (LAN) interface, a wide area network (WAN) interface, a DICOM interface, the Internet, or any other type of network interface, in accordance with various embodiments of the present invention, allowing for the computer 110 and the digital storage medium 510 to be located remotely from the medical imaging machine 150.

In accordance with an embodiment of the present invention, the medical imaging machine 150 saves digital medical images to the digital storage medium 510 via the interface 610, and the computer 110 accesses stored digital medical images from the digital storage medium 510 via the interface 125. In accordance with an alternative embodiment of the present invention, the digital storage medium 510 is an integral part of the medical imaging machine 150.

In summary, embodiments of the present invention provide a system and method to define and store calibration data for unique combinations of manufacturer, device, size and/or resolution information of medical imaging hardware that is used to generate un-calibrated digital medical images. A medical imaging software application is provided that is able to access an un-calibrated or previously calibrated digital medical image, read the associated manufacturer, device, size, and/or resolution information, access the corresponding image calibration data, and apply the image calibration data to the digital medical image to generate a new, calibrated digital medical image. Embodiments of the present invention take advantage of digital medical images that are "tagged" with imaging hardware information including manufacturer, device, size, and/or resolution information.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of providing image calibration data for calibrating a digital medical image, said method comprising:
   defining one image calibration data for each unique combination of manufacturer, device, size, and/or resolution information that is associated with digital medical images to be processed by a medical imaging software application using at least one computer-based platform;
   storing said defined image calibration data such that said defined image calibration data may be accessed by at least said medical imaging software application said at least one computer-based platform;
   accessing a digital medical image, using at least said medical imaging software application said at least one computer-based platform;
   reading manufacturer, device, size, and/or resolution information associated with said accessed digital medical image, using at least said medical imaging software application said at least one computer-based platform;
   accessing one of said stored image calibration data corresponding to said accessed digital medical image based on said read manufacturer, device, size, and/or resolution information, using at least said medical imaging software application said at least one computer-based platform; and
   applying said accessed image calibration data to said digital medical image to generate a newly calibrated digital medical image, using at least said medical imaging software application said at least one computer-based platform.

2. The method of claim 1 wherein said manufacturer information identifies a particular manufacturer of a medical imaging machine used to capture said digital medical image.

3. The method of claim 2 wherein said device information identifies a particular imaging sensor type used with said medical imaging machine to capture said digital medical image.

4. The method of claim 3 wherein said size information identifies a particular size of said imaging sensor type used with said medical imaging machine to capture said digital medical image.

5. The method of claim 2 wherein said medical imaging software application resides on said medical imaging machine.

6. The method of claim 2 wherein said medical imaging software application resides on a processor-based platform which is independent of said medical imaging machine.

7. The method of claim 1 wherein said digital medical image comprises a two-dimensional image of digital pixel data.

8. The method of claim 1 wherein said digital medical image comprises a three-dimensional image of digital voxel data.

9. The method of claim 1 wherein said applying said accessed image calibration data to said digital medical image comprises transforming said digital medical image from a medical imaging hardware coordinate system to a real-world coordinate system.

10. The method of claim 1 wherein each of said defined image calibration data comprises at least a single numeric value.

11. The method of claim 1 wherein said digital medical images are in a DICOM (Digital Imaging and Communications in Medicine) format.

12. The method of claim 1 wherein said image calibration data are used for adjusting at least one distance dimension of digital medical images.

13. A system for providing image calibration data and for calibrating a digital medical image, said system comprising a computer-based platform hosting a medical imaging software application, said computer-based platform used for at least:
   accessing a digital medical image, using at least said medical imaging software application;
   reading manufacturer, device, size, and/or resolution information associated with said accessed digital medical image, using at least said medical imaging software application;
   accessing stored image calibration data corresponding to said accessed digital medical image based on said read manufacturer, device, size, and/or resolution information, using at least said medical imaging software application; and
   applying said accessed image calibration data to said digital medical image to generate a newly calibrated digital medical image, using at least said medical imaging software application.

14. The system of claim 13 wherein said manufacturer information identifies a particular manufacturer of a medical imaging machine used to capture said digital medical image.

15. The system of claim 14 wherein said device information identifies a particular imaging sensor type used with said medical imaging machine to capture said digital medical image.

16. The system of claim 15 wherein said size information identifies a particular size of said imaging sensor type used with said medical imaging machine to capture said digital medical image.

17. The system of claim 16 further comprising said imaging sensor type being of said particular size.

18. The system of claim 14 wherein said computer-based platform is an integral part of said medical imaging machine.

19. The system of claim 14 wherein said computer-based platform is independent of said medical imaging machine.

20. The system of claim 13 further comprising said medical imaging machine.

21. The system of claim 13 wherein said digital medical image comprises a two-dimensional image of digital pixel data.

22. The system of claim 13 wherein said digital medical image comprises a three-dimensional image of digital voxel data.

23. The system of claim 13 wherein said applying said accessed image calibration data to said digital medical image comprises transforming said digital medical image from a medical imaging hardware coordinate system to a real-world coordinate system.

24. The system of claim 13 wherein said image calibration data comprises at least a single numeric value.

25. The system of claim 13 wherein said digital medical images are in a DICOM (Digital Imaging and Communications in Medicine) format.

26. The system of claim 13 wherein said image calibration data are used for adjusting at least one distance dimension of digital medical images.

27. A method of providing image calibration data for calibrating a digital medical image, said method comprising:

defining one image calibration data for each unique combination of manufacturer, device, size, and/or resolution information that is associated with digital medical images to be processed by a medical imaging software application using at least one computer-based platform;

storing said defined image calibration data such that said defined image calibration data may be accessed by at least said medical imaging software application said at least one computer-based platform;

accessing a digital medical image, using at least said medical imaging software application said at least one computer-based platform;

reading manufacturer, device, size, and/or resolution information associated with said digital medical image, using at least said medical imaging software application said at least one computer-based platform; and accessing one of said stored image calibration data corresponding to said digital medical image based on said read manufacturer, device, size, and/or resolution information, using at least said medical imaging software application said at least one computer-based platform.

28. The method of claim 27 further comprising applying said accessed image calibration data to said digital medical image to generate a newly calibrated digital medical image.

* * * * *

UNITED STATES PATENT AND TRADEMARK OFFICE
CERTIFICATE OF CORRECTION

PATENT NO.       : 7,616,796 B2                                 Page 1 of 1
APPLICATION NO. : 11/203858
DATED            : November 10, 2009
INVENTOR(S)      : Kevin M. Crucs It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1122 days.

Signed and Sealed this

Nineteenth Day of October, 2010

David J. Kappos
*Director of the United States Patent and Trademark Office*